UNITED STATES PATENT OFFICE.

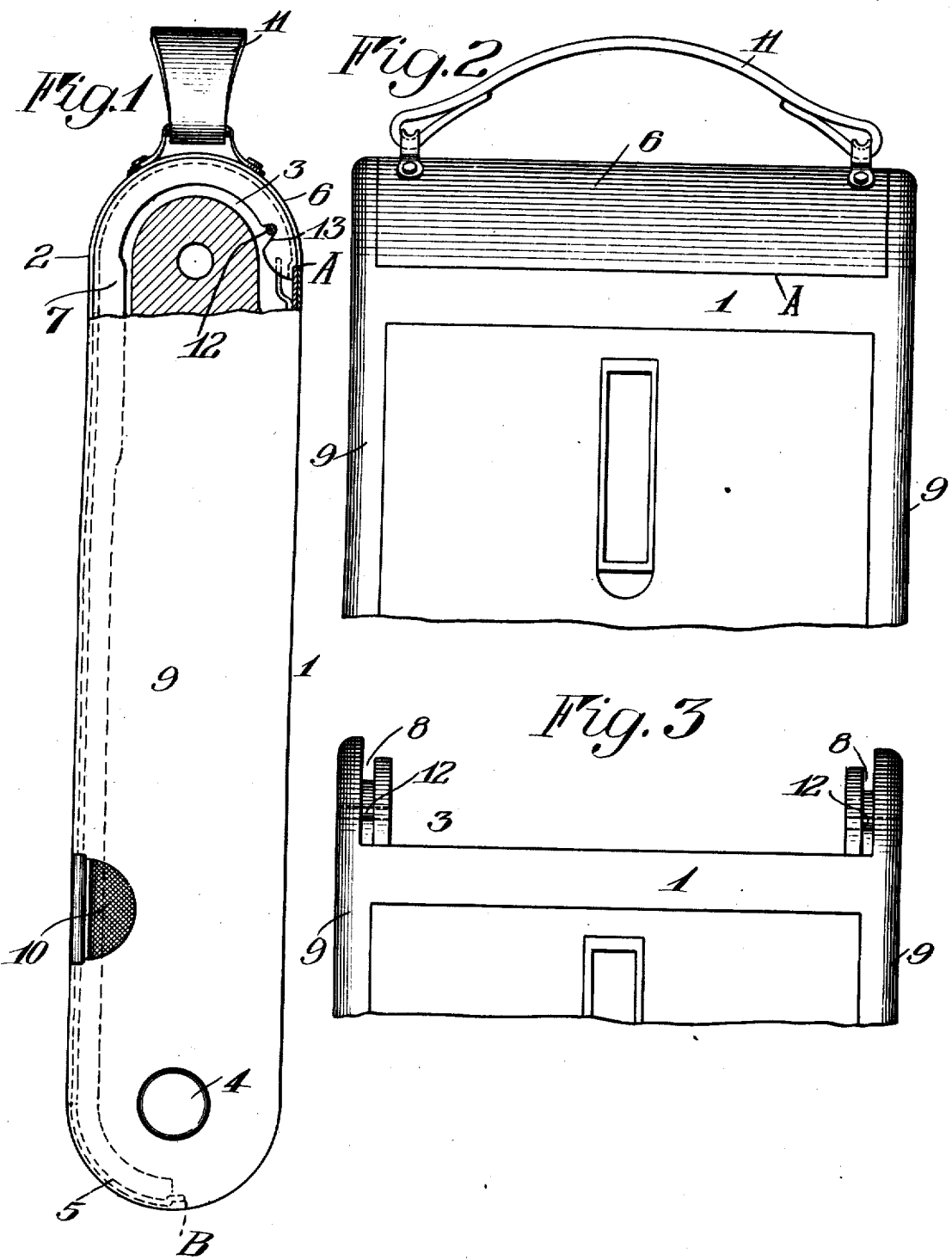

CHARLES F. SPEIDEL, OF ROCHESTER, NEW YORK, ASSIGNOR TO EASTMAN KODAK COMPANY, OF ROCHESTER, NEW YORK, A CORPORATION OF NEW YORK.

CAMERA-BACK.

1,319,910.　　　　Specification of Letters Patent.　　Patented Oct. 28, 1919.

Application filed July 5, 1918. Serial No. 243,270.

*To all whom it may concern:*

Be it known that I, CHARLES F. SPEIDEL, of Rochester, in the county of Monroe and State of New York, have invented certain new and useful Improvements in Camera-Backs; and I do hereby declare the following to be a full, clear, and exact description of the same, reference being had to the accompanying drawings, forming a part of this specification, and to the reference-numerals marked thereon.

My present invention relates to photography and more particularly to hand cameras of the flat folding type, and it has for its object to improve the arrangements of the removable backs as applied to these cameras whereby the engagement of the back with the body is made more secure, and the back is relieved from the dangers of distortion as a result of the carrying handle for the camera being attached to the back instead of to the camera body. To these and other ends the invention resides in certain improvements and combinations of parts, all as will be hereinafter more fully described, the novel features being pointed out in the claims at the end of the specification.

In the drawings:

Figure 1 is a side elevation partly in section of a folded hand camera constructed in accordance with and illustrating one embodiment of my invention, Fig. 2 is a fragmentary front view with the camera back in place, and Fig. 3 is a similar view with the back removed.

Similar reference characters throughout the several figures indicate the same parts.

The general features of the camera of the present embodiment do not require extended description, as I have shown a camera of the familiar type that is relatively thin from front to rear and comprises a body 1 and a back 2. It is a folding film camera, the film chambers being located at opposite ends or at the top and bottom in the present views. One of them is indicated at 3 in Figs. 1 and 3, and a spool center or support for the other is seen at 4 in Fig. 1. Access to the rear and top portions of the camera and hence to the film chamber 3 is gained through the removal of the back 2, which extends from the point A to the point B in Fig. 1, and normally closes the camera at the rear and at this one end, thus constituting one wall of the film chamber 3. The back may and preferably does consist of a sheet metal plate having a short curved portion 5 at the lower end and a more extended forwardly turned curved portion 6 at the other end, providing the said wall of the spool or film chamber 3. Lateral flanges 7 on the back coöperate with and occupy grooves 8 in the top and rear edges of the side walls 9 of the camera body to provide a light tight joint, and the end or top and bottom edges of the back also fit in slot-like portions formed in the adjacent edges of the opening in the body for the same purpose. Suitable catches 10 normally hold the back locked to the body against removal toward the rear in conjunction with the curved portion 6 of the back and to remove the latter these catches are released, and the back is rocked forwardly (the lower end moving rearwardly) on the upper edge A thereof until it can be lifted and the curved portion 6 disengaged, such rocking being necessitated by the fact that the curved portion coöperates with the body at the extreme front thereof. The back is applied by following the same movements in the reverse order.

In this type of camera, the carrying handle 11 for the instrument is usually attached to the back 2 instead of directly to the body, and to the curved portion 6 of the back which is at the top of the assembled camera. The weight of the camera imposed thereon thus has a tendency to separate the back and body and a tendency to distort the curved portion 6 of the latter, that is, to widen the curve on which it is formed. In the practice of my invention I counteract this tendency by providing an additional interlocking engagement between the forward portion of the curved extension 6 of the back and the body, and in the present instance the interlocking elements consist of pins or bars 12 on the body that extend transversely through the side walls 1 thereof and span the slots 8 at a forward point at each side or end of the film chamber 3. At corresponding points in the flanges 7 of the curved extension 6 of the back, I provide inclined notches 13 adapted to receive these pins. When the back is applied to the camera and is rocked into position, rearwardly at the top and forwardly at the bottom on the edge A as a center, the notches and pins go into interlocking engagement with each other in the manner clearly shown in Fig. 1, so that the pull on the carrying strap 11 in a direction parallel with the general plane of the back is borne partly by the catches 10 and partly by the notched portions 13 of the flanges 7, so that there is no tendency to spread or straighten the curved portion 6 of the back. The engagement or interlocking action is entirely automatic and requires no thought on the part of the operator, while it adds little, if anything, to the cost of producing the camera.

I claim as my invention:

1. The combination with a camera body, of a removable back coöperating with and closing the rear side thereof and also extending forwardly at one end to close that end of the body, and rigid interlocking devices on said forwardly extending portion and on the camera body adapted to coöperate by a rearward movement of the former and to resist separation of said parts in a direction parallel to the general plane of the back.

2. The combination with a camera body, of a removable back coöperating with and closing the rear side thereof and also extending forwardly to close the end of the body, said forwardly extending portion being provided with lateral flanges having notches therein, and means on the forward portion of the body adapted to occupy the said notches in the flanges of the back to resist separation of the parts and distortion of the back in a direction parallel to the general plane of the latter.

3. The combination with a camera body having a film chamber at one end thereof and a pin extending longitudinally relatively to said chamber at a forward point, of a removable back coöperating with and closing the rear side of the body, and also having a curved portion extending forwardly to constitute a wall of the film chamber, said forwardly extending portion being provided with lateral flanges having notches therein interlocking with the pin on the body to resist separation of the parts and distortion of the back in a direction parallel to the general plane of the latter.

4. The combination with a camera body having a film chamber at one end thereof and a pin extending longitudinally relatively to said chamber at a forward point, of a removable back coöperating with and closing the rear side of the body, and also having a curved portion extending forwardly to constitute a wall of the film chamber, said forwardly extending portion being provided with lateral flanges having notches therein interlocking with the pin on the body to resist separation of the parts and distortion of the back in a direction parallel to the general plane of the latter, and a carrying handle secured to the forwardly extending portion of the back.

5. The combination with a camera body, of a removable back coöperating with and closing the rear side thereof and also extending forwardly at one end to close the top of the body, rigid interlocking devices on said forwardly extending portion and on the camera body adapted to coöperate by a rearward movement of the former and to resist separation of the parts and distortion of the back in a direction parallel to the general plane of the latter, and a carrying handle for the camera secured to the forwardly extending portion of the back.

6. The combination with a folding hand camera body having a film chamber at one end thereof and locking projections arranged forwardly relatively to said chamber, of a removable back coöperating with and closing the rear side of the body, and also having a curved portion extending forwardly to constitute a wall of the film chamber, said forwardly extending portion being provided with lateral flanges having notches therein adapted to interlock with the projections on the body as the back is rocked into position by first engaging said portion at the front of the body and then carrying the lower portion of the back forwardly against the rear of the body.

CHARLES F. SPEIDEL.